P. J. RIDENOUR.
AUTOMOBILE ATTACHMENT.
APPLICATION FILED JULY 23, 1921.
1,424,679.
Patented Aug. 1, 1922.
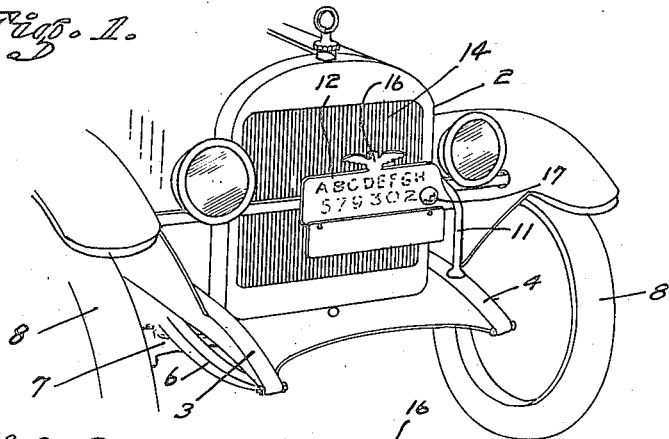
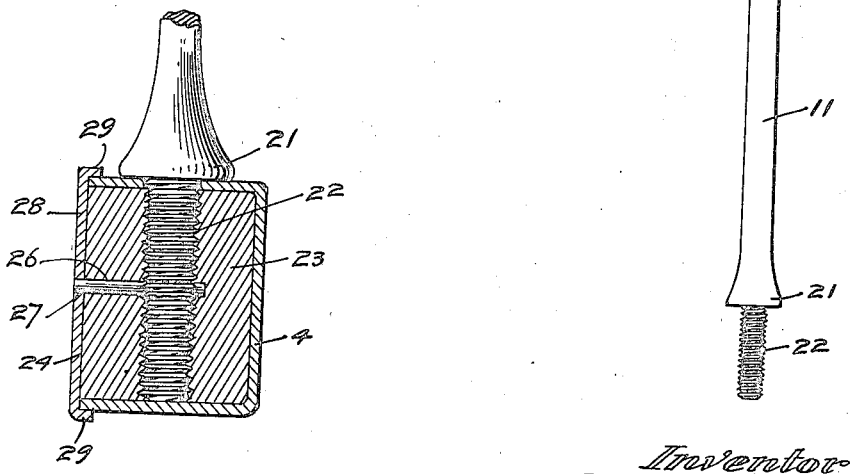
Inventor
PERRY J. RIDENOUR
By
Attorneys.

UNITED STATES PATENT OFFICE.

PERRY J. RIDENOUR, OF SILVER CITY, NEW MEXICO.

AUTOMOBILE ATTACHMENT.

1,424,679.

Specification of Letters Patent.   Patented Aug. 1, 1922.

Application filed July 23, 1921. Serial No. 487,069.

*To all whom it may concern:*

Be it known that I, PERRY J. RIDENOUR, a citizen of the United States, and resident of Silver City, county of Grant and State of New Mexico, have invented a new and useful Automobile Attachment, of which the following is a specification.

The present invention relates to improvements in automobile attachments and more specifically to such attachments as serve to prevent, or to lead to the speedy discovery of, thefts of the automobile provided with the same. The object of the invention is to provide automobiles of a certain make, whichever happens to adopt the device, with an attachment that will show to the public and to the police the make of the car and the motor number of the same, both being interrelated in such a manner that neither can be changed without affecting the other or giving a mutilated appearance to the attachment, and the latter being connected to the automobile in such a manner that it cannot be separated from the car except by breaking it and so interrelated with the parking and tail lights that their removal would turn out both lights thereby attracting the attention of the police.

The preferred embodiment of the invention is shown in the accompanying drawing, in which Figure 1 represents a perspective view of the front portion of an automobile having my device attached thereto, Figure 2 an enlarged detail front view of my device and Figure 3 an enlarged detail view of the means for securing my device to the automobile.

Referring to the drawings in detail, it will be seen that in Figure 1 the front portion of an automobile (2) is shown, its two longitudinal frame members (3) and (4) resting on the springs (6) which are supported on the front axle (7) carried by the wheel (8). The frame members (3) and (4) are slightly curved channel irons, lying on one side and toeing inward, as shown in cross-section in Figure 3. One of these frame members, (4), I use as a support for my device, which consists of a metal rod (11) preferably made of an aluminum alloy, a plate (12) secured to its upper end so as to extend right across the front of the radiator (14) having a decorative identifying sign like the eagle (16) secured to its top and the name represented by the letters A B C D E F G and the number of the motor as "579 302" cut into it and being provided with a parking light (17) preferably of red glass. A number of perforations (18) serve to receive small bolts securing the license number plate to the device.

My device is secured to the frame member (4) in the following manner: The lower end of the rod (11) ends in a base (21) of enlarged cross-section and has a threaded stud (22) of reduced section extending beyond the base, which stud is adapted to be screwed into the nut (23) which latter just fits into the channel of the frame member (4). In this position the nut exposes only one side (24), the other three sides bearing against the web and the flanges of the channel respectively. From the side (24) a small hole (26) extends into the nut so as to cross its threaded portion. When the stud (22) is screwed into the nut (23), a drill is inserted into this hole and is operated to drill a registering hole through the stud. A pin (27) is then inserted in the registering holes and welded into the nut so as to guard against its ever getting loose. A covering plate (28) is then placed over the one exposed side of the nut in such manner that its two flanges (29) grip the toes of the channel and is welded into its place.

An equal device is secured to the rear end of the machine, having preferably one of the fenders for a back ground and supporting the tail light, which should be in the same circuit as the parking light.

The letters and figures appearing on the plate may be either cut into the same or the plate material may be cut away from them; in either case they would stand out prominently.

It will be seen that if a certain make of cars were equipped with my device and this fact became known through advertisements or otherwise, it would be practically impossible to steal the car. Any car of that particular type, if seen without the device, would immediately attract attention and cause the police to investigate. It would be impossible to remove the device without leaving traces of violence. As long as the device would show in full, it could be easily traced by its motor number. The figures could not be changed without mutilating the plate and the fact that the name appears vertically over the signature would prevent the tearing off of a figure, as the "5" for instance. This figure, if taken off by itself would leave the plate mutilated; if taken off by a straight vertical cut, the letter "A" would be taken out too and thus the name would be mutilated.

I claim:

1. An anti-theft device for an automobile comprising means for displaying an identifying word, an identifying number and a law required light in inseparable relation to each other, a stud on said means, a flanged frame member for the automobile, a block adapted to receive the stud secured between the flanges, means for locking the stud to the block and a flanged cover permanently secured to the toes of the flanges for holding the block in its place.

2. An anti-theft device for an automobile comprising means for displaying an identifying word, an identifying number and a law required light in inseparable relation to each other, a threaded stud on said means, a flanged frame member for the automobile, a nut adapted to receive the stud secured between the flanges and a pin penetrating the nut and the stud for firmly binding them together, a flanged cover being placed over the nut and welded to the toes of the flanges for holding the nut in its place.

PERRY J. RIDENOUR.